Jan. 9, 1951      E. C. CONLEY      2,537,209
ELECTRICALLY OPERATED TRAP

Filed Jan. 2, 1948      2 Sheets-Sheet 1

INVENTOR.
EDWARD C. CONLEY
BY
McMorrow, Berman & Davidson
ATTORNEYS

Jan. 9, 1951 E. C. CONLEY 2,537,209
ELECTRICALLY OPERATED TRAP
Filed Jan. 2, 1948 2 Sheets-Sheet 2
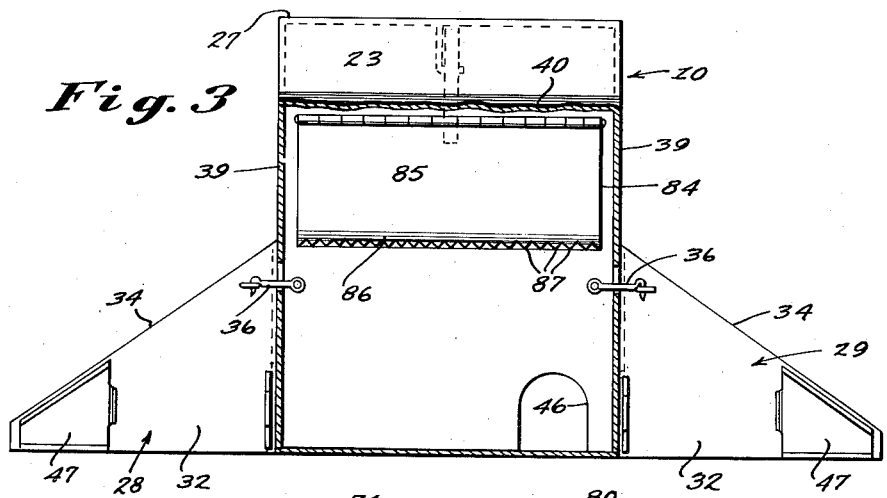
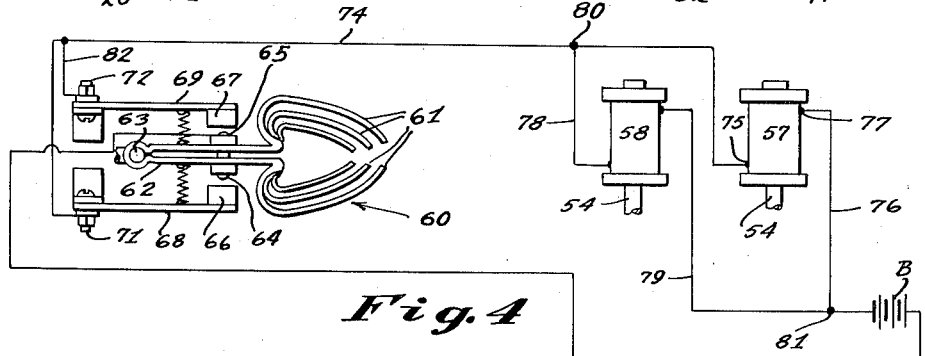
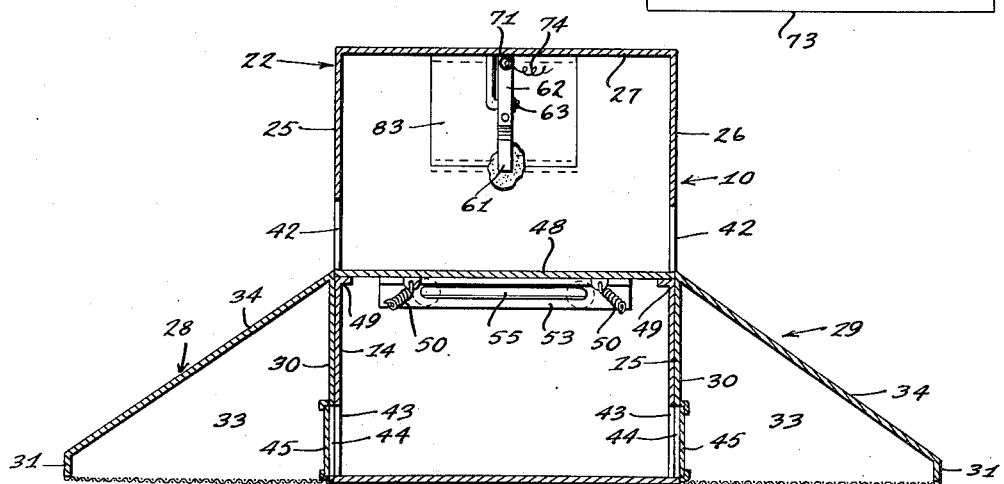
INVENTOR.
EDWARD C. CONLEY
BY
McMorrow, Berman & Davidson
ATTORNEYS Patented Jan. 9, 1951

2,537,209

UNITED STATES PATENT OFFICE 2,537,209

ELECTRICALLY OPERATED TRAP

Edward C. Conley, Leavenworth, Kans.

Application January 2, 1948, Serial No. 223

3 Claims. (Cl. 43—64)

My invention relates to a trap for rodents and other small animals.

An important object of the invention is to provide a trap for rodents, such as rats, and other small animals which is electrically operated, and automatically resetting after being sprung, so that it is adapted for continuous catching of the animals.

A further object is to provide a trap of the above mentioned class which catches the rodent or animal alive and without injury.

A still further object of the invention is to provide a trap of novel construction, which is practical, and relatively inexpensive to manufacture.

Other objects and advantages of the invention will be apparent during the course of the following description.

Figure 1:
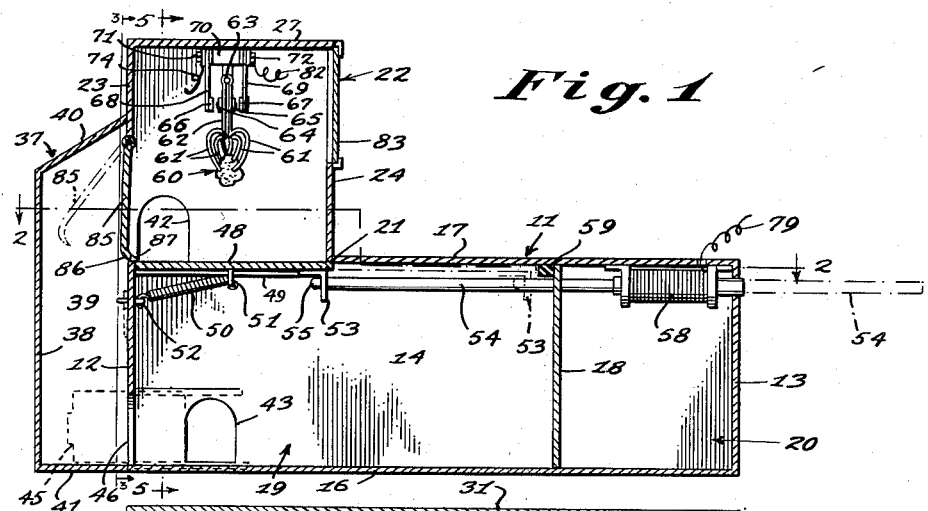
Figure 2:
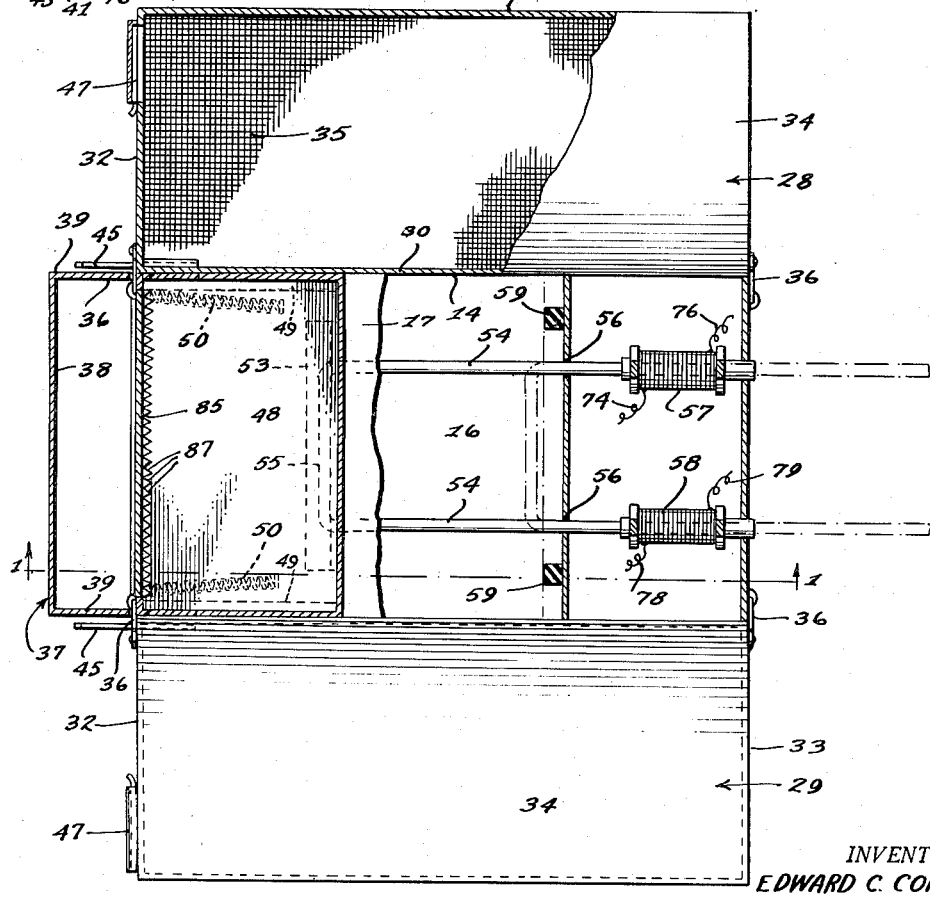

In the accompanying drawings, forming a part of this application, and in which like numerals are employed to designate like parts throughout the same, Figure 1 is a vertical section through a trap embodying the invention, taken on line 1—1 of Figure 2, Figure 2 is a horizontal section taken on line 2—2 of Figure 1, Figure 3 is an end elevation viewed from line 3—3, part in section, Figure 4 is a diagrammatic view of an electric circuit, and, Figure 5 is a vertical section taken on line 5—5 of Figure 1.

In the drawings, where for the purpose of illustration is shown a preferred embodiment of the invention, the numeral 10 designates a central integral main body portion of the trap. This central main body portion 10 comprises a lower rectangular box or chamber 11, including vertical rectangular front and rear ends 12 and 13, vertical sides 14 and 15, rectangular flat bottom 16, and flat horizontal top 17. An intermediate vertical wall or partition 18 extends between the sides 14 and 15, and parallel to ends 12 and 13. This partition 18 is disposed toward the rear portion of chamber 11, and divides the same into a large forward chamber 19 and rear chamber 20.

The top 17 terminates near the longitudinal center of chamber 19, as at 21, leaving the forward portion of chamber 19 open at the top. Arranged above the chamber 14 adjacent to the forward opening in the top 17 is an upper rectangular box or chamber 22, including front and rear vertical ends 23 and 24, sides 25 and 26 and a top 27. The chamber 22 is supported upon the lower chamber 11, and is preferably formed integral therewith. The upper chamber 22 extends for the full width of lower chamber 11.

Disposed at the sides 14 and 15 of chamber 11, and extending for the entire lengths of such sides are detachable side chambers or boxes 28 and 29. The detachable chambers 28 and 29 comprise inner vertical sides 30, disposed flat against sides 14 and 15, in assembly, and outer low sides 31, which are vertical and parallel to sides 30. The chambers 28 and 29 also comprise front and rear ends 32 and 33, and tops 34, which are inclined and slope upwardly from the top edges of sides 31 to the bottom of upper chamber 22. The lower longitudinal edges of tops 34 are close to the bottoms 35 of chambers 28 and 29, and bottoms 35 are formed of wire mesh or screen, so that water may pass into the chambers 28 and 29 through the bottoms 35. Small latches or hooks 36 carried by the front and rear ends 12 and 13 serve to detachably connect the side chambers 28 and 29 to the main body portion 10 of the trap.

A forward vertical narrow auxiliary chamber 37 is provided, and extends across the full width of front end 12. This auxiliary chamber 37 includes a front vertical end 38, vertical sides 39, inclined top 40, and bottom 41, which may be a continuation of bottom 16.

Suitable openings 42 are formed in the sides 25 and 26, at the tops of inclined tops 34, as shown. The openings 42 permit the rodent to walk up the inclined tops 34 to enter the upper chamber 22 from either side of the trap. Similar openings 43 and 44 are provided in the sides 14 and 15 of lower chamber 19, and in sides 30 of detachable chambers 28 and 29. These openings 43 and 44 register in assembly, and form passages through which the trapped rodent may pass, in going from the central lower chamber 19 into either of the detachable side chambers. Manually operated doors or slides 45 are arranged upon the inner faces of sides 30, and these slides 45 are operable to cover and uncover the openings 44 in sides 30. An opening or passage 46 is formed in front end 12, and serves to connect the interiors of chambers 19 and 37, so that a rodent or animal can pass from chamber 37 into chamber 19. Forward end sliding doors 47 are provided upon the ends 32 to facilitate removal of the trapped rodent after it has been drowned.

A normally closed horizontal rectangular slidable trap door 48 is arranged to form the bottom of upper chamber 22. This door 48 is electrically operated, and adapted to slide horizontally rearwardly, beneath the top 17, so that a rodent or animal standing thereon will fall into the lower chamber 19. The door 48 is slidably supported upon rails or angle members 49, secured to sides 14 and 15. A pair of suitable retractile coil springs 50 are connected to depending apertured lugs 51 carried by trap door 48, and also to similar apertured lugs 52 secured to side 12. These springs serve to keep the trap door 48 normally closed, and to return it to the closed position when opened. Near its rear edge, the trap door 48 has rigidly secured to it a depending transverse angle member 53, which extends for most of the width of door 48. The depending member 53 has a pair of openings to receive the longitudinal parallel sides 54 of a trap door actuating member or loop, including a forward transverse end 55. The end 55 is arranged upon the forward side of depending member 53, and when pulled rearwardly, the trap door 48 is likewise moved rearwardly to be opened. The sides 54 of the trap door actuating loop extend rearwardly, and pass through guide openings 56 in partition 18, as shown. The sides 54 project through the cores of electrical solenoids 57 and 58, which are mounted upon the under side of top 17, and in the rear chamber 20. The sides 54 are adapted to move through openings in the rear end 13 of chamber 20, when the solenoids are energized to move the trap door actuating loop. The loop including sides 54 is made of magnetic iron, or the like, and the sides 54 constitute plungers to be magnetized by the solenoids, and moved axially within the solenoids, to actuate the trap door 48. Rubber bumper blocks 59 are mounted upon the front face of partition 18, and serve to limit the rearward travel of member 53.

Arranged within the upper chamber 22, and mounted upon the top 27 thereof is a depending bait holder 60, comprising depending curved resilient bait holding prongs 61, mounted upon a vertically disposed bar 62 of electrical insulating material. The bar is universally suspended, as at 63, and carries opposed electrical contacts 64 and 65, which are electrically connected, and adapted to be moved to engage contacts 66 and 67, carried by depending spring contact arms 68 and 69, secured to an insulating block 70, by terminal or binding post screws 71 and 72. The arrangement is such, that a slight movement of the bait holder 60 will cause either of the contacts 64 or 65 to engage a contact 66 or 67 to close a circuit to energize the solenoids 57 and 58 simultaneously, to open sliding trap door 48.

The electric circuit is best shown in Figure 4, and comprises a battery B, arranged at any suitable location outside of the trap. This battery B is connected to a wire 73 which leads directly to and is connected with the electrical contacts 64 and 65, as shown in Figure 4. A wire 74 is connected to the terminal screw 71, and leads to the coil of solenoid 57, where it is connected thereto at 75. A wire 76 is connected to the coil of solenoid 57, as at 77, and leads back to battery B. Wires 78 and 79 are connected at 80 and 81 to the wires 74 and 76, and serve to connect the solenoid 58 in parallel with the solenoid 57. A wire 82 is connected to terminal screw 72 and to wire 74, as shown.

A sliding door 83 is provided in the side 24, as shown, to facilitate replenishing the bait held in prongs 61.

A large rectangular opening 84 is provided in the end 23, below inclined top 40, and extends for substantially the full width of end 23, and downwardly to the trap door 48. A hinged wall section or panel 85 is hingedly connected to the end 23, as shown and is adapted to swing vertically outwardly, when pushed from the inside of chamber 22. The panel 85 is suitably spring loaded inwardly, so as to remain normally closed. The lower longitudinal edge 86 of panel 85 projects inwardly, and is provided with longitudinally spaced prongs 87, which project inwardly and downwardly, and rest upon the front edge of trap door 48, when the panel and trap door are closed.

In operation, a rat or like rodent is seeking the bait will walk up either of the inclined tops 34 and enter chamber 22 through either opening 42. The rat stands on trap door 48, and takes the bait held in prongs 61. This causes the insulated arm 62 to swing slightly, and one of the contacts 64 or 65 will engage a contact 66 or 67. This closes the circuit, and energizes solenoids 57 and 58, which act on sides 54 to slide the trap door 48 to the open position, shown dotted in Figure 1. As soon as the contact at the arm 62 is broken, the springs 50 cause the trap door 48 to snap back to its normally closed position, the solenoids having been deenergized when the contact is broken.

When this takes place, normally the rat standing upon the trap door will fall into the lower chamber 19, and enter either of the dark side chambers 28 and 29 through either pair of openings 43 and 44. When this happens, the slides 45 of chambers 28 and 29 are closed manually, and the hooks 36 are opened to disconnect the chamber 28 or 29 from the main body portion 10. The side chambers 28 and 29, when detached, may be submerged in water to drown the rat.

It should be noted that the trap is automatically reset, each time a rat is caught and the trap door 48 returns to the closed position. The trap is thus adapted to continuously catch rats, or other small animals, and no manual resetting is needed.

In rare cases a rat may become caught between the front edge of the trap door 48 and the lower edge of panel 85, since the tray door snaps closed quite fast. When this occurs, the panel 85 will yield outwardly, slightly and the rat can wriggle loose and drop into lower chamber 19. The downwardly projecting teeth 87 will prod the rat, and prevent its climbing back up into chamber 22. The action of panel 85 will not injure the rat, however. If the rat should push the panel 85 out far enough to fall into chamber 37, it will enter lower chamber 19 through opening 46.

It is to be understood that the form of the invention herewith shown and described is to be taken as a preferred example of the same, and that various changes in the shape, size and arrangement of parts may be resorted to, without departing from the spirit of the invention, or the scope of the subjoined claims.

Having thus described the invention, I claim:

1. An animal trap, comprising a main body portion including upper and lower chambers, bait holding means including a pivoted arm carrying electrical contact elements arranged within the upper chamber, stationary electrical contact elements arranged in the upper chamber to be engaged by the first named contact elements, a sliding trap door arranged between the upper and lower chambers, an iron loop engaging the trap door and movable longitudinally to open said trap door, electrical solenoids having openings to receive the sides of the iron loop and energizable to move the loop for opening the trap door, wires electrically connecting the solenoids and said first named and second named electrical contact elements, and resilient means biasing the trap door toward closed position.

2. An animal trap comprising a body portion including upper and lower chambers, bait holding means including a pivoted arm carrying electrical contact elements arranged within said upper chamber, stationary electrical contact elements arranged within the upper chamber to be engaged by the first named contact elements, a trapdoor arranged between the upper and lower chambers and mounted for sliding movement into and away from closing position between said chambers, an electrical solenoid in said lower chamber, wires electrically connecting the solenoid and said first and second named electrical contact elements, an actuating member slidably supported in said solenoid having one end secured to said door and movable in response to energization of said solenoid to move said door away from closing position between said chambers, and resilient means operatively connected to said door for biasing the latter into closed position.

3. An animal trap comprising a body portion including upper and lower chambers, bait holding means including a pivoted arm carrying electrical contact elements arranged within said upper chamber, stationary electrical contact elements arranged within the upper chamber to be engaged by the first named contact elements, a trapdoor arranged between the upper and lower chambers and mounted for sliding movement into and away from closing position between said chambers, an electrical solenoid in said lower chamber, wires electrically connecting the solenoid and said first and second named electrical contact elements, an actuating member slidably supported in said solenoid having one end secured to said door and movable in response to energization of said solenoid to move said door away from closing position between said chambers, resilient means operatively connected to said door for biasing the latter into closed position, and bumper blocks within the lower chamber and engageable with said trapdoor to limit the movement of the latter away from closing position.

EDWARD C. CONLEY.

REFERENCES CITED

The following references are of record in the file of this patent:

UNITED STATES PATENTS

| Number | Name | Date |
| --- | --- | --- |
| 689,641 | Douthett | Dec. 24, 1901 |
| 1,464,697 | Connolly | Aug. 14, 1923 |
| 2,107,080 | Mitchell | Feb. 1, 1938 |

FOREIGN PATENTS

| Number | Country | Date |
| --- | --- | --- |
| 16,065 | Great Britain | 1911 |